US009786127B2

(12) United States Patent
Marshall et al.

(10) Patent No.: US 9,786,127 B2
(45) Date of Patent: Oct. 10, 2017

(54) SYSTEMS AND METHODS FOR INTERACTIVE GAMES

(71) Applicant: Game Play Network, Inc., Los Angeles, CA (US)

(72) Inventors: David M. Marshall, Los Angeles, CA (US); Russell M. Fine, Los Angeles, CA (US); Joseph J. Hasson, Encino, CA (US); Douglas W. Tung, Santa Monica, CA (US)

(73) Assignee: Game Play Network, Inc., Los Angeles, CA (US)

( * ) Notice: Subject to any disclaimer, the term of this patent is extended or adjusted under 35 U.S.C. 154(b) by 0 days.

(21) Appl. No.: 14/208,216

(22) Filed: Mar. 13, 2014

(65) Prior Publication Data

US 2014/0274352 A1 Sep. 18, 2014

Related U.S. Application Data

(60) Provisional application No. 61/779,945, filed on Mar. 13, 2013.

(51) Int. Cl.
*G07F 17/32* (2006.01)
*A63F 13/00* (2014.01)

(52) U.S. Cl.
CPC ...... *G07F 17/3262* (2013.01); *G07F 17/3209* (2013.01); *G07F 17/3211* (2013.01);
(Continued)

(58) Field of Classification Search
CPC ............. G07F 17/3244; G07F 17/3262; G07F 17/3288
See application file for complete search history.

(56) References Cited

U.S. PATENT DOCUMENTS 4,582,324 A 4/1986 Koza et al. ............... 273/138 A
5,749,785 A 5/1998 Rossides ......................... 463/25
(Continued)

FOREIGN PATENT DOCUMENTS

WO 2006060438 1/2006
WO WO 2011/109454 9/2011
(Continued)

*Primary Examiner* — James S McClellan
*Assistant Examiner* — Kevin Carter
(74) *Attorney, Agent, or Firm* — Sheppard Mullin Richter & Hampton LLP

(57) ABSTRACT

The invention relates to systems and methods of gaming, including online gambling. The system may enable betting to be performed by a user with respect to one or more events (e.g., the betting results are revealed to the user (optionally in a time delayed manner) based at least in part on the user's game play with respect to an interactive game (e.g., an online interactive electronic game)). By way of example and not limitation, the event may be a sporting event, a lottery, stock market activity, a political race, or other form of risk resolution that provides a return against an amount wagered. The interactive game may involve physical coordination, problem solving and/or other activity unrelated to the underlying event being wagered on. Further, the actual selection of events (e.g., races and competitors, stocks, etc.) to bet on may be automatically selected, without requiring the user to perform manual selections.

24 Claims, 9 Drawing Sheets

(52) U.S. Cl.
CPC ...... *G07F 17/3225* (2013.01); *G07F 17/3227* (2013.01); *G07F 17/3241* (2013.01); *G07F 17/3244* (2013.01); *G07F 17/3288* (2013.01); *A63F 13/00* (2013.01); *G07F 17/326* (2013.01)

(56) References Cited

U.S. PATENT DOCUMENTS

| | | | | |
|---|---|---|---|---|
| 6,450,887 | B1 | 9/2002 | Mir et al. | 463/42 |
| 6,511,375 | B1 | 1/2003 | Kaminkow | 463/20 |
| 6,729,961 | B1 | 5/2004 | Millerschone | 463/30 |
| 6,749,500 | B1 | 6/2004 | Nelson et al. | 463/13 |
| 6,761,632 | B2 | 7/2004 | Nolz et al. | 463/16 |
| 6,786,818 | B1 | 9/2004 | Rothschild et al. | 463/20 |
| 7,530,892 | B2 | 5/2009 | Jordan et al. | 463/20 |
| 7,658,672 | B1 | 2/2010 | Wolf et al. | 463/13 |
| 7,666,082 | B2 | 2/2010 | Kane | |
| 7,785,187 | B2 | 8/2010 | Millerschone | 463/17 |
| 7,798,896 | B2 | 9/2010 | Katz et al. | 463/20 |
| 7,931,531 | B2 | 4/2011 | Oberberger | 463/25 |
| 7,942,735 | B2 | 5/2011 | Meyer et al. | 463/25 |
| 7,950,993 | B2 | 5/2011 | Oberberger | 463/16 |
| 8,012,014 | B2 | 9/2011 | Low et al. | 463/25 |
| 8,162,735 | B2 | 4/2012 | Walker et al. | 463/16 |
| 8,167,309 | B1 | 5/2012 | Laut | 273/250 |
| 8,348,753 | B2 | 1/2013 | Low et al. | 463/25 |
| 8,353,757 | B2 | 1/2013 | Walker | |
| 8,376,833 | B1 | 2/2013 | Gagner et al. | 463/20 |
| 8,393,949 | B2 | 3/2013 | Kane | |
| 8,430,735 | B2 | 4/2013 | Oberberger | 463/16 |
| 8,449,375 | B2 | 5/2013 | Oberberger | 463/20 |
| 8,613,649 | B2 | 12/2013 | Low et al. | 463/16 |
| 8,651,960 | B2 | 2/2014 | Malik | |
| 8,657,680 | B2 | 2/2014 | Chung et al. | 463/31 |
| 8,721,433 | B2 | 5/2014 | Walker et al. | 463/25 |
| 8,764,567 | B2 | 7/2014 | Smith et al. | 463/42 |
| 8,777,735 | B1 | 7/2014 | Fine et al. | 463/25 |
| 8,784,198 | B2 | 7/2014 | Walker | |
| 8,819,758 | B2 | 8/2014 | Howe | |
| 8,845,409 | B2 | 9/2014 | Kane | |
| 8,864,564 | B2 | 10/2014 | Oberberger | 463/16 |
| 8,864,572 | B2 | 10/2014 | Oberberger | 463/20 |
| 8,961,300 | B2 | 2/2015 | Fine | 463/25 |
| 8,961,301 | B2 | 2/2015 | Fine et al. | 463/25 |
| 8,968,082 | B2 | 3/2015 | Fine et al. | 463/25 |
| 8,968,104 | B2 | 3/2015 | Fine et al. | 463/42 |
| 8,974,284 | B2 | 3/2015 | Selby et al. | 463/16 |
| 8,986,096 | B2 | 3/2015 | Fine et al. | 463/16 |
| 8,992,311 | B2 | 3/2015 | Fine | 463/25 |
| 8,992,312 | B2 | 3/2015 | Fine et al. | 463/25 |
| 9,070,252 | B2 | 6/2015 | Riahei | |
| 9,070,253 | B2 | 6/2015 | Tung | |
| 9,076,294 | B2 | 7/2015 | Fine | |
| 9,076,295 | B2 | 7/2015 | Fine | |
| 9,092,939 | B2 | 7/2015 | Fine | |
| 9,092,940 | B2 | 7/2015 | Fine | |
| 9,214,063 | B2 | 12/2015 | Fine | |
| 9,224,262 | B2 | 12/2015 | Fine | |
| 9,299,218 | B2 | 3/2016 | Fine | |
| 9,305,428 | B2 | 4/2016 | Fine | |
| 9,317,997 | B2 | 4/2016 | Fine | |
| 9,317,998 | B2 | 4/2016 | Fine | |
| 9,317,999 | B2 | 4/2016 | Fine | |
| 9,406,195 | B2 | 8/2016 | Fine | |
| 9,443,383 | B2 | 9/2016 | Fine | |
| 9,489,798 | B2 | 11/2016 | Fine | |
| 9,536,385 | B2 | 1/2017 | Fine | |
| 9,552,694 | B2 | 1/2017 | Fine | |
| 9,552,696 | B2 | 1/2017 | Fine | |
| 9,558,623 | B2 | 1/2017 | Fine | |
| 2001/0007828 | A1 | 7/2001 | Walker et al. | 463/26 |
| 2001/0008842 | A1 | 7/2001 | Walker et al. | 463/16 |
| 2002/0010013 | A1 | 1/2002 | Walker et al. | 463/16 |
| 2002/0049082 | A1 | 4/2002 | Bansemer et al. | 463/20 |
| 2002/0077165 | A1 | 6/2002 | Bansemer et al. | 463/7 |
| 2002/0151363 | A1 | 10/2002 | Letovsky et al. | 463/40 |
| 2002/0169018 | A1 | 11/2002 | Schneier et al. | 463/17 |
| 2003/0003980 | A1 | 1/2003 | Moody | 463/16 |
| 2003/0013514 | A1 | 1/2003 | Cregan et al. | 463/20 |
| 2003/0054879 | A1 | 3/2003 | Schneier et al. | 463/29 |
| 2003/0060276 | A1 | 3/2003 | Walker et al. | 463/25 |
| 2003/0078103 | A1 | 4/2003 | LeMay | |
| 2003/0199312 | A1 | 10/2003 | Walker et al. | 463/25 |
| 2003/0220133 | A1 | 11/2003 | Walker et al. | 463/20 |
| 2004/0072618 | A1 | 4/2004 | Bartholomew et al. | 463/42 |
| 2004/0229671 | A1 | 11/2004 | Stronach et al. | 463/6 |
| 2004/0235542 | A1 | 11/2004 | Stronach et al. | 463/6 |
| 2004/0259631 | A1 | 12/2004 | Katz | |
| 2005/0054441 | A1 | 3/2005 | Landrum et al. | 463/35 |
| 2005/0143170 | A1 | 6/2005 | Maya et al. | 463/26 |
| 2006/0035697 | A1 | 2/2006 | Packes | |
| 2006/0082056 | A1 | 4/2006 | Kane | |
| 2006/0111172 | A1 | 5/2006 | Walker et al. | 463/16 |
| 2006/0121973 | A1 | 6/2006 | Parisien | 463/16 |
| 2006/0135249 | A1 | 6/2006 | Seelig et al. | 463/22 |
| 2006/0154720 | A1 | 7/2006 | Okuniewicz | 463/25 |
| 2006/0154721 | A1 | 7/2006 | Okuniewicz | 463/25 |
| 2006/0258459 | A1 | 11/2006 | Davis | |
| 2006/0294568 | A1 | 12/2006 | Walter | |
| 2007/0060254 | A1 | 3/2007 | Muir | 463/16 |
| 2007/0060295 | A1 | 3/2007 | DeMar et al. | 463/20 |
| 2007/0173327 | A1 | 7/2007 | Kilgore et al. | 463/42 |
| 2007/0178969 | A1 | 8/2007 | Luciano, Jr. et al. | 463/42 |
| 2007/0265060 | A1 | 11/2007 | Hornik et al. | 463/20 |
| 2007/0265068 | A1 | 11/2007 | Kane et al. | 463/29 |
| 2007/0293305 | A1 | 12/2007 | Amour | 463/25 |
| 2008/0045295 | A1 | 2/2008 | Walker et al. | 463/16 |
| 2008/0064478 | A1 | 3/2008 | Roukis et al. | 463/20 |
| 2008/0070669 | A1 | 3/2008 | Walker et al. | 463/16 |
| 2008/0085769 | A1 | 4/2008 | Lutnick | |
| 2008/0108425 | A1 | 5/2008 | Oberberger | |
| 2008/0176637 | A1 | 7/2008 | Letovsky et al. | 463/20 |
| 2008/0200225 | A1 | 8/2008 | Walker et al. | 463/7 |
| 2008/0270288 | A1 | 10/2008 | Butterly | |
| 2008/0300055 | A1 | 12/2008 | Lutnick et al. | 463/39 |
| 2009/0027367 | A1 | 1/2009 | Liu et al. | 463/29 |
| 2009/0093299 | A1 | 4/2009 | Acres | 463/20 |
| 2009/0227367 | A1 | 9/2009 | Schneier | |
| 2009/0227377 | A1 | 9/2009 | Yin | |
| 2009/0247272 | A1 | 10/2009 | Abe | 463/20 |
| 2009/0291736 | A1 | 11/2009 | Walker et al. | 463/20 |
| 2009/0312094 | A1 | 12/2009 | DeWaal et al. | 463/29 |
| 2010/0016056 | A1 | 1/2010 | Thomas et al. | 463/20 |
| 2010/0035679 | A1 | 2/2010 | Oram | 463/25 |
| 2010/0062840 | A1 | 3/2010 | Herrmann | 463/25 |
| 2010/0120491 | A1 | 5/2010 | Mclaughlin et al. | 463/20 |
| 2010/0144428 | A1* | 6/2010 | Fontaine | G06Q 50/34 463/28 |
| 2010/0304843 | A1 | 12/2010 | Aoki et al. | 463/25 |
| 2011/0086702 | A1 | 4/2011 | Borst et al. | 463/30 |
| 2011/0212766 | A1 | 9/2011 | Bowers et al. | 463/25 |
| 2011/0218028 | A1 | 9/2011 | Acres | 463/20 |
| 2011/0224001 | A1 | 9/2011 | Yin | 463/42 |
| 2011/0224002 | A1 | 9/2011 | Burke et al. | 463/42 |
| 2011/0250974 | A1* | 10/2011 | Shuster | G07F 17/3232 463/43 |
| 2011/0287841 | A1* | 11/2011 | Watanabe | G07F 17/329 463/42 |
| 2012/0071223 | A1 | 3/2012 | Sharkov et al. | 463/20 |
| 2012/0100918 | A1 | 4/2012 | Ginsberg et al. | 463/42 |
| 2012/0172112 | A1 | 7/2012 | Sklanka | |
| 2012/0178514 | A1* | 7/2012 | Schulzke | G07F 17/3295 463/17 |
| 2012/0202571 | A1 | 8/2012 | Stanek et al. | 463/17 |
| 2012/0214576 | A1 | 8/2012 | Okuniewicz | 463/25 |
| 2012/0244923 | A1 | 9/2012 | Wolf et al. | 463/11 |
| 2012/0302312 | A1 | 11/2012 | Katz et al. | 463/17 |
| 2012/0309499 | A1 | 12/2012 | Bigelow et al. | 463/21 |
| 2012/0315979 | A1 | 12/2012 | Eads | 463/25 |
| 2012/0315981 | A1 | 12/2012 | Gagner et al. | 463/25 |
| 2012/0322545 | A1* | 12/2012 | Arnone | G07F 17/3272 463/25 |
| 2013/0072288 | A1 | 3/2013 | Thoeni | |
| 2013/0102372 | A1 | 4/2013 | Lutnick et al. | 463/13 |

(56) References Cited

U.S. PATENT DOCUMENTS

| | | | | |
|---|---|---|---|---|
| 2013/0122999 | A1 | 5/2013 | Gagner et al. | 463/25 |
| 2013/0165209 | A1 | 6/2013 | Lemay et al. | 463/25 |
| 2013/0165210 | A1 | 6/2013 | Nelson et al. | 463/25 |
| 2013/0172059 | A1 | 7/2013 | Nicely et al. | 463/5 |
| 2013/0190074 | A1 | 7/2013 | Arnone et al. | 463/25 |
| 2013/0217471 | A1 | 8/2013 | Arnone et al. | 463/20 |
| 2013/0225272 | A1 | 8/2013 | Moshal | 463/25 |
| 2013/0225298 | A1 | 8/2013 | Hamlin et al. | 463/42 |
| 2013/0237326 | A1 | 9/2013 | Arnone et al. | 463/42 |
| 2013/0244764 | A1 | 9/2013 | Arnone et al. | 463/25 |
| 2013/0244765 | A1 | 9/2013 | Arnone et al. | 463/25 |
| 2013/0252687 | A1 | 9/2013 | Arnone et al. | 463/16 |
| 2013/0252693 | A1 | 9/2013 | Arnone et al. | 463/17 |
| 2013/0252718 | A1 | 9/2013 | Arnone et al. | 463/25 |
| 2013/0324220 | A1 | 12/2013 | Dicillo et al. | 463/25 |
| 2013/0324228 | A1 | 12/2013 | Barber | 463/25 |
| 2013/0337887 | A1 | 12/2013 | Meistrich et al. | 463/22 |
| 2014/0024437 | A1 | 1/2014 | Vann et al. | 463/25 |
| 2014/0024442 | A1 | 1/2014 | Johnson et al. | 463/25 |
| 2014/0024454 | A1 | 1/2014 | Patchen | 463/36 |
| 2014/0040765 | A1 | 2/2014 | Fung et al. | 715/748 |
| 2014/0080585 | A1 | 3/2014 | Anderson et al. | 463/25 |
| 2014/0082645 | A1 | 3/2014 | Stern et al. | 725/13 |
| 2014/0087851 | A1 | 3/2014 | Low et al. | 463/25 |
| 2014/0094274 | A1 | 4/2014 | Guinn et al. | 463/25 |
| 2014/0135084 | A1 | 5/2014 | Venkat et al. | 463/7 |
| 2014/0274263 | A1 | 9/2014 | Fine et al. | 463/16 |
| 2014/0274264 | A1 | 9/2014 | Fine et al. | 463/16 |
| 2014/0274265 | A1 | 9/2014 | Fine et al. | 463/16 |
| 2014/0274266 | A1 | 9/2014 | Fine et al. | 463/16 |
| 2014/0274267 | A1 | 9/2014 | Fine | 463/16 |
| 2014/0274268 | A1 | 9/2014 | Marshall et al. | 463/16 |
| 2014/0274269 | A1 | 9/2014 | Fine et al. | 463/16 |
| 2014/0274270 | A1 | 9/2014 | Fine et al. | 463/16 |
| 2014/0274271 | A1 | 9/2014 | Fine et al. | 463/16 |
| 2014/0274272 | A1 | 9/2014 | Tung et al. | 463/16 |
| 2014/0274325 | A1 | 9/2014 | Fine et al. | 463/25 |
| 2014/0274326 | A1 | 9/2014 | Fine et al. | 463/25 |
| 2014/0274327 | A1 | 9/2014 | Fine et al. | 463/25 |
| 2014/0274328 | A1 | 9/2014 | Fine et al. | 463/25 |
| 2014/0274329 | A1 | 9/2014 | Fine et al. | 463/25 |
| 2014/0274330 | A1 | 9/2014 | Selby et al. | 463/25 |
| 2014/0274331 | A1 | 9/2014 | Fine et al. | 463/25 |
| 2014/0274333 | A1 | 9/2014 | Fine | 463/25 |
| 2014/0274334 | A1 | 9/2014 | Fine et al. | 463/25 |
| 2014/0274335 | A1 | 9/2014 | Fine et al. | 463/25 |
| 2014/0274336 | A1 | 9/2014 | Tung et al. | 463/25 |
| 2014/0274337 | A1 | 9/2014 | Fine et al. | 463/25 |
| 2014/0274338 | A1 | 9/2014 | Fine et al. | 463/25 |
| 2014/0274339 | A1 | 9/2014 | Fine et al. | 463/25 |
| 2014/0274340 | A1 | 9/2014 | Fine et al. | 463/25 |
| 2014/0274365 | A1 | 9/2014 | Riahei et al. | 463/29 |
| 2014/0302905 | A1 | 10/2014 | Fine et al. | 463/16 |
| 2015/0170470 | A1 | 6/2015 | Fine | |
| 2015/0170471 | A1 | 6/2015 | Fine | |
| 2015/0199875 | A1 | 7/2015 | Fine | |
| 2015/0206389 | A1 | 7/2015 | Fine | |
| 2015/0332554 | A1 | 11/2015 | Fine | |
| 2016/0071368 | A1 | 3/2016 | Fine | |
| 2016/0071372 | A1 | 3/2016 | Fine | |
| 2016/0098898 | A1 | 4/2016 | Fine | |
| 2016/0232746 | A1 | 8/2016 | Fine | |
| 2016/0247351 | A1 | 8/2016 | Fine | |
| 2016/0275753 | A1 | 9/2016 | Fine | |

FOREIGN PATENT DOCUMENTS

| | | |
|---|---|---|
| WO | WO 2012/078668 | 6/2012 |
| WO | WO 2014/160446 | 10/2014 |

* cited by examiner

SYSTEMS AND METHODS FOR INTERACTIVE GAMES

FIELD OF THE INVENTION

This application claims priority to U.S. Provisional Patent Application No. 61/779,945, filed Mar. 13, 2013, which is incorporated by reference herein in its entirety.

BACKGROUND OF THE INVENTION

Field of the Invention

The present invention is generally related to gaming.

Description of the Related Art

Horse racing has a long tradition in the United States and indeed, throughout the world. Horseracing, and associated betting, can be found in most states in the United States, and in many other countries. However, with the passing of time, people have become less familiar with horses, horse racing, and race betting. Conventional betting systems for horse racing have failed to provide an adequately engaging, approachable environment for the typical person who is not familiar with horse racing and betting.

BRIEF DESCRIPTION OF THE DRAWINGS

Embodiments will now be described with reference to the drawings summarized below. These drawings and the associated description are provided to illustrate example embodiments, and not to limit the scope of the invention.

DETAILED DESCRIPTION

Figure 1:
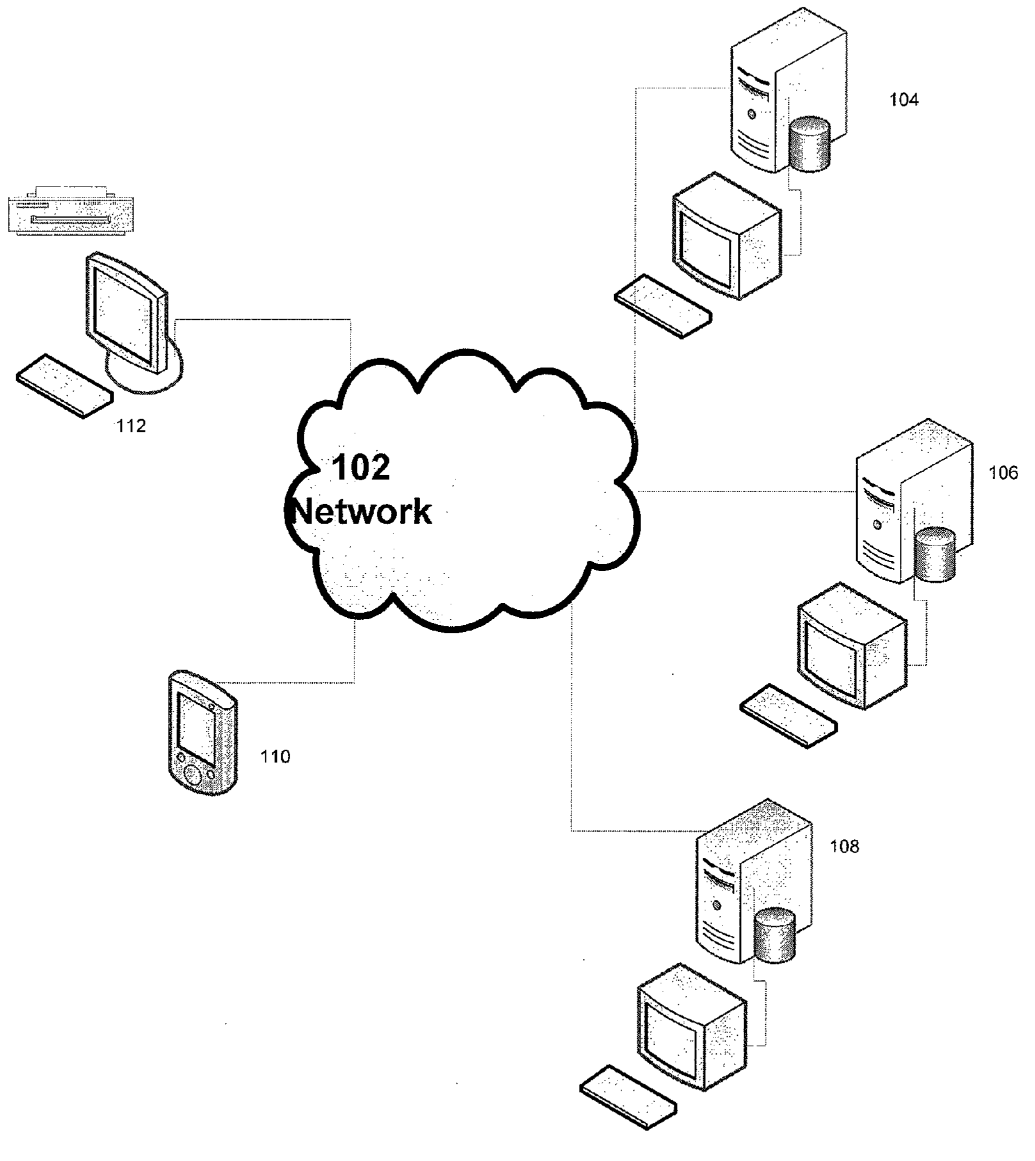
FIG. 1 illustrates an example networked system.

Certain embodiments described herein relate to gaming, including online gambling. Certain embodiments described herein enable betting to be performed by a user with respect to one or more events (e.g., wherein the betting results are revealed to the user (optionally in a time delayed manner) based at least in part on the user's game play with respect to an interactive game (e.g., an online interactive electronic game)). By way of example and not limitation, the event may be a sporting event, a lottery, stock market activity, a political race, or other form of risk resolution that provides a return against an amount wagered. The interactive game, by way of example and not limitation, may involve physical coordination, problem solving or another activity unrelated to the underlying event being wagered on. Further, the actual selection of events (e.g., races and competitors, stocks, etc.) to bet on may optionally be automatically selected, without requiring the user to perform manual selections. Certain embodiments thereby enable new games to be synthesized from existing games and wagerable events (such as a sporting event). Thus, fun and exciting interactive games may be provided, with cash payouts funded by results from wagers on one or more forms of gambling.

By way of example and not limitation, the form of gambling may be a racing event (e.g., horse racing or dog racing), and the betting may be performed using a pari-mutuel system. Thus, optionally wagering on a sporting event via pari-mutuel pools may be integrated into interactive, electronic games.

As is well known, the pari-mutuel system (sometimes known as a "totalisator") is a betting system in which bets of a particular type are pooled together and the final payout is not determined until the results are declared official. The house (e.g., the race track) may take a portion of the bets as payment for the betting related functions provided. The payoff odds are calculated by sharing the betting pool among the winning bets. By contrast, in fixed odds betting, the payout is generally agreed at the time the bet is made. Certain embodiments may place wagers using fixed odds betting.

Common bets in horse racing include:

- Win: where the bettor must pick the horse that wins the race in order to win the bet.
- Place: where the bettor must pick a horse that finishes either first or second race in order to win the bet.
- Show: where the bettor must pick a horse that finishes first, second or third in the race in order to win the bet.
- Exacta, perfecta, or exactor: where the bettor must pick the two horses that finish first and second in the race, in the correct order in order to win the bet.
- Trifecta: where the bettor must pick the three horses that finish first, second, and third in the race, in the correct order in order to win the bet.
- Superfecta: in order to win, the bet the bettor must pick the four horses that finish first, second, third, and fourth in the race, in the correct order in order to win the bet.
- Box: wherein a better can place a "box" around exotic betting types (e.g., exacta, trifecta or superfecta bets) in order to place a bet for all permutations of the numbers in the box.
- Any2 or Duet: where the bettor must pick the two horses that will place first, second or third in the race but can finish in any order in order to win the bet.
- Double or Quinella: where the bettor must pick the winners of two successive races in order to win the bet.
- Triple Pick3: where the bettor must pick the winners of three successive races in order to win the bet.
- Quadrella: where the bettor must pick the winners of four nominated races at the same track in order to win the bet.
- Sweep or pick four: where the bettor must pick the winners of four or more successive races in order to win the bet.
- Pick six: where the better must pick the winners of six or more successive races in order to win the bet, with a consolation payment made to bettors that correctly selected five winners out of six races, and with "roll-over" jackpots accumulating each day until one or more bettors correctly picks all six winners.

Additional, fewer, or different types of wagers may be utilized. Further, different sporting events may be associated with different types of wagers and certain of the foregoing wagers may not be relevant while other types of wagers may be relevant.

Win, place and show wagers are generally referred to as straight bets, and the other example wagers listed above are generally referred to as exotic bets. Generally, the greater the odds against winning, the higher the payout and the lower the frequency of a payout. Exotic bets have greater odds against winning than straight bets, but generally with higher payouts when a win occurs.

The interactive game may be, by way of example and not limitation, a crossword puzzle, an action game, a puzzle game, a shooting game (e.g., a first person shooter game), a strategy game (e.g., chess, checkers, go, etc.), a pinball-type game, a card game, a game where a given user competes with one or more other users, a game of chance, such as a slot machine, a bingo game, a lottery, etc. The interactive game may also be a passive form of entertainment requiring little if any intervention from the "player". Optionally, instead of an interactive game, the wager results may be revealed in a delayed fashion via other mediums. For example, a slide show may be presented to the user, with random payouts presented to the user while watching the slide show. Thus, certain embodiments do not require a game or game play in order to provide the delayed reveal functionality described herein.

Certain embodiments may be used in conjunction with advanced deposit wagering (ADW), where a bettor needs to fund his account before being allowed to place bets. Racetrack owners, horse trainers and/or state governments may, in certain instances, receive a portion of ADW revenues. Thus, for example, the user may open a customer account and fund that account, where the funds may optionally be held in a segregated trust account. The funding may be provided by electronic fund transfer, via a prepaid card, via a debit or ATM card, via a credit card, and/or otherwise. The user funding may then be used to place bets, as further described below. The system may also verify the user's identity via information (e.g., a social security number, a passport number, etc.) provided by the user from a government issued document, such as a social security card, passport, driver's license, or the like, and request that the user create a user ID and password. Optionally, when legal, wagers may be made without advance funding, and user accounts may be settled at a later date (e.g., by invoicing the user, charging a user credit card, or otherwise).

The system may offer a user tokens for purchase (e.g., using an account previously funded by the user via ADW or using a virtual wallet hosted by the system) and/or tokens may be provided to a user without charge (e.g., as a consolation prize for a losing bet, as a loyalty reward, a bonus, or otherwise). Bonuses may also be provided based at least in part on the amount and/or value of the tokens played by the user. Tokens of different denominations may be made available for purchase (e.g., 10 cents, 50 cents, $1 dollar, $2 dollars, 5 dollars, 10 dollars, etc.). It is understood that the term token as used herein generally refers to a value or instrument (e.g., that may correspond to an amount being bet and may include the results or the race(s) and payout(s)), and that unless the context indicates otherwise, a token need not appear to be a coin or be limited to a particular representation. Thus, a token may initially correspond to an amount being wagered, and then additional information, such as the outcome of the wager, may be associated with the token.

A token may also refer to a unit of value tied to a currency, such as the U.S. dollar, or may refer to one or more units of value in any form, including by way of example, digital currency, rewards points, virtual currency, tournament points, experience points in a game, or other form of measure or value. Optionally, a token may also embody value from more than one type of unit of value, such as a token being worth $0.10 in U.S. currency plus 10 airline miles. Tokens may also refer to a "potential" for value (which in itself is a value) or a time-value such as stock options or futures.

By way of illustration and not limitation, a token may correspond to a future bet on a sporting event. For example, if a user purchases a $1.00 token, the system may automatically place one or more bets on one or more sporting events totaling about $1.00. Optionally, a fixed amount and/or a percentage of the token purchase price are retained by the system operator, acting as the house. A user may, via a user interface, purchase tokens of different values and/or different quantities of different token types. The user's account balance in terms of the amount of deposit and the amount and/or value of the tokens the user has purchased that have not yet been used may be displayed via the token purchase user interface and/or via another user interface. The display may be updated to reflect additional token purchases or expenditures made by the user. Tokens may be used to place or initiate wagers, and/or to purchase virtual goods.

Thus, the purchase or use of a token may initiate one or more wagers, the results of which are optionally revealed to the user incrementally, in a delayed manner, and after the event generating the results takes place and the underlying wagers or units of value are determined (e.g., after the sporting event takes place, such as after a race results are declared official). As will be discussed herein, the wagers (corresponding to one or more tokens being played by the user) may be distributed over a combination of wager types. For example, the wagers may be distributed over straight wagers and exotic wagers, to increase the likelihood of frequent wins via the straight wagers, with a relatively infrequent larger payout from the exotic wagers, which may make the game play more exciting from a user perspective. Optionally instead, all of the bets may be placed on straight wagers to further increase the likelihood of a payout. Optionally, all the bets may be placed on exotic wagers to further increase the likelihood of a large payout, even though the probability of receiving any payout may be decreased. The bets may be placed to enhance the randomness of the payouts.

By way of further example and not limitation, the selection of events on which wagers are placed by the system may optionally be placed based at least in part one or more of the following:

- the number of entries in the event (e.g., the number of runners in a race);
- a desired risk profile;
- the number of possible combinations (e.g., where the number of combinations may be linearly or non-linearly based on the number of competitors in an event);
- the number of favorites or long shots in an event.
- For example a results curve, reflecting desired wagering results or distribution, may be generated by breaking a given token (or group of tokens) down into smaller individual wagers, to thereby synthesize the results curve using sub-component bets. The synthesis of a results curve may be performed across multiple events by placing different wagers (tokens) on different events.

Optionally, when the user purchases several tokens, and corresponding wagers are placed, winnings resulting from one token may be distributed in whole or in part to other tokens. For example, if one token resulted in a large winning, and five other tokens resulted in no winnings, the system may allocate winnings from the large winning across the five other tokens, so that regardless of which token is used to initiate game play, the user will receive a reward as a result of the game play.

Optionally, wagers may be distributed across one or more tokens, within or across customer accounts. The order in which tokens belonging to a customer are revealed to a customer may be based in part on the outcome of the wagers underlying those tokens. For example, if three tokens resulted in winnings, and two other tokens resulted in no winnings, the system may alternate between revealing a token associated with winnings with a token associated with no winnings, so that the user is not disappointed by having several reveals in a row with no winnings.

Optionally, the system may choose from available tokens which tokens to reveal based on the odds and/or outcome of the underlying wagers associated with the tokens. For example, how the system chooses which tokens to reveal and the manner in which they are revealed can affect or be affected by gameplay. For example, the selection as to which tokens are to be revealed and the manner in which they are revealed may be performed so as to enhance the corresponding entertainment value. By way of illustration, if the user captures a very valuable item in a game, such as a gold chest, the system may reveal a token associated with a relatively large payout, while if the user finds a low value item, such as a glove, the system may reveal a token associated with a relatively small payout.

Optionally, a token may correspond to a fraction of a wager, where a given wager is formed by multiple tokens, where the multiple tokens may be sourced from on user's account or the account of multiple users and/or a house accounts. This enables multiple users to pool their tokens together to place a relatively larger wager. A reward may be assigned to users in proportion to the number of tokens they contributed to the wager.

Optionally, the number of in game prizes that can be or are revealed may be based at least in part on the number of tokens played.

Optionally, the system may take into account fees charged by different venues (e.g., racetracks), intermediaries, and/or government entities in deciding how to allocate bets. For example, the system may access such fee information, and determine that bets should not be placed, or should be placed relatively less frequently, at certain venues or in certain states or cities because the fee(s) are too large. The determination as to where to place bets may be made to enhance profitability of the system operator and/or to minimize such fees.

Optionally, the user may specify the wager mix at the time the tokens are purchased, or earlier, via the user's account preference information. For example, different tokens may be offered that correspond to different types of wagers. There may be a frequent payout token (which may cause wagers to be placed substantially entirely on straight bets or other bet-types with a relatively high likelihood of resulting in some level of payout), a high multiple of return token (which may cause wagers to be placed substantially entirely on exotic bets or the like with a relatively high payout multiple in the event of a wager win), or a balanced risk token (which may cause wagers to be distributed over straight bets and exotic bets). By way of further example, there may be a token associated with a specific type of wager, such as a quick-pick superfecta wager. For certain tokens, when used by the user, the system will automatically pick the horses and races to bet on, without the user having to identify the horses or races. Different tokens may also be typed to be used to wager on specific pools, runners, races, or other events. The token type may be identified in a user interface to the user via text, color (e.g., a gold token is worth $10, and a copper token is worth $1.00), graphics, and/or otherwise.

As discussed in greater detail elsewhere herein, tokens may be associated with events/wagers that occurred in the past, where the system associating the tokens with the wagers does not have access to the wager outcome with respect to a given token, at the time the wagers are allocated to tokens or customers. For example, the outcome may be cryptographically encoded and stored, so that the outcome is digitally sealed and tamperproof.

When the user accesses the system, a user interface may be presented to the user, enabling the user to select an interactive game mode or a user wagering mode. For example, in a user wagering mode, the user may make direct wagering decisions, such as by directly placing bets on sporting events (e.g., selecting tracks, races, horses, wager types, wager amounts, etc.) and wherein payouts are not revealed as part of an interactive game, but are instead simply revealed after a race (or races), corresponding to the user-placed bet, is completed. Optionally, the system may enable the user to use the same user account and ADW account to access and utilize either mode (e.g., for direct wagering and playing interactive games).

When the user is ready to play a game and selects the interactive game mode, the user may select the interactive game from a plurality of available games via a game menu or otherwise. Games may be presented to the user in one or more groupings, wherein the groupings may be based at least in part on how many tokens are needed to play the game. In addition or instead, games may be grouped according to game type or other game characteristics (e.g., action games, strategy games, one person shooter games, card games, most popular games, newest games, etc.). The amount wagered may correspond to the tokens needed to play the game.

Optionally, one or more bets are placed at least partly in response to a token being purchased (e.g., on the next suitable event on which a wager may be placed). Depending on the availability of sporting events to bet on, the user may be informed that the game play will be delayed until such an event is completed, to thereby enable the bet to be placed on the event and the results of the wager to be known. Optionally, one or more bets are placed at least partly in response an interactive game being initiated by the user.

Depending on the availability of sporting events to bet on when the user purchases a token, a corresponding bet may not be immediately placed and the initiation of the interactive game with respect to the user may be optionally correspondingly delayed. For example, if there is no race beginning for 5 minutes (corresponding to 11:35 PM local user time), the system may estimate how long it will take to complete the race (e.g., 2 minutes after the race starts), and may calculate the total time until the race is estimated to be over (e.g., 5 minutes until the race starts+2 minutes until the race is estimated to be completed). The system may then generate a wait notification which may be provided for display (via a user terminal) to the user indicating when the interactive game will begin, which may correspond to about the start time of the race and the estimated race duration (e.g., "your game will start in about 7 minutes, at about 11:37 PM"). Optionally, the interactive game may begin prior to the race or the completion of the event, but the results of the wager are not revealed to the user until the completion of the event and after the results of the wager are received by the system (which may be after the user has completed the interactive game), where the results may be revealed in a delayed fashion as similarly described above. Optionally, the interactive game may begin prior to the race or after the beginning, but prior to the completion of the race, but the bet is not placed until one or more specified events occur with respect to the game. Optionally, the user may queue up results for one or more tokens, so that there will generally be a token whose results are known, and is ready for playing.

In an example embodiment, once the bet is placed (and optionally not until all the sporting events/races are concluded and the bet results are determined by the system), the interactive game may begin (although as discussed elsewhere herein, optionally gameplay may begin before the bet is placed and/or results are known). Based at least in part on the detection of certain interactions of the user with the interactive game, the user may be awarded additional tokens and/or legal currency or other item of value. The awards may be based in whole or in part on the results of the bet(s) placed based on the token value. However, optionally it may appear to the user that the awards are based on game activity and not dependent on an external physical sporting event. The user may optionally be notified substantially immediately, upon the occurrence of certain interactions that trigger a reveal of an award, of the corresponding award (e.g., the award amount). The award may be displayed to the user while the interactive game interface is also displayed, and may be displayed within the interactive game and/or external to the interactive game.

For example, if the game is a target game, a portion of the winnings corresponding to the bet(s) may be awarded to the user each time the user hits a target, where the award (including the amount) is displayed to the user substantially immediately after a target is hit. Thus, the reveal of the bet winnings may be incrementally revealed to the user in a time delayed manner in the environment of the interactive game. Different amounts may be awarded (revealed) based at least in part on the type interaction, such as the type of target hit or the area of a target.

For example, if the user purchased a $1.00 token(s) and applied the token(s) to play the interactive game, then $1.00 (minus any features deducted by the system) may be wagered on one or more races. Assuming that the $1.00 in bets resulted in a $3.00 payout, and the target is a bulls eye with different award zones (e.g., a $1.00 award zone near the center of the target, a 50 cent award zone surrounding the $1.00 award zone, and a 25 cent award zone surrounding the 50 cent award zone), each time the user hits a given zone with a virtual projectile, the corresponding award is displayed to the user. Once the system determines that the user has been awarded the $3.00 payout (minus any deductions), the user is so informed and is prompted by the system to purchase more tokens or to use already purchased tokens in the user's account. Otherwise, the game is optionally ended by the system.

Gameplay may optionally be modified by the system based at least in part on the results of the wager(s) associated with the token(s) used to play the game, the results of a wager(s) associated with the token(s) used to play a different game, the value of the token(s) played, the type of tokens played and/or the number of tokens played. For example, based on one or more of the foregoing criteria, a user may be given more virtual lives, extended game play, additional weapons, additional powers, additional land, additional bonus points, more game events shown, etc. By way of further example, gameplay modifications may include modifying game decision points, a reordering of game events, the provision of bonuses (e.g., in the form of points, virtual goods, badges, in-game prizes), the provision of bonus points that may have redemption value (e.g., that can be exchanged for physical goods, services, monetary exchange, etc.), the modification of the path of moving objects within the game, the modification of the form of objects within the game, ending a game round or period of play earlier, extending a game round or period of play, enabling the user to continue playing at the next game level without having to restart at the beginning of the game (e.g., if the user loses the game, the user does not have to start back at the beginning, or if the user's token has been played out, the user may be permitted to add additional tokens without having to start back at the beginning of the game), etc.

Thus, certain embodiments time shift the display of results of wagers in order for the consumer to have the illusion that the awards are being won in real time, as a result of the user's game play, even though the results of the wagers may already be known by the system prior to the user playing the game, and even though the user may be able to collect the results of the wagers without playing the game.

Further, game events may optionally be used as a metaphor for a time delay or wait period. Such metaphors may time shift game play to match the availability of tokens. By way of example and not limitation, the user may have selected a game to play, but the wager results for the token applied to the selected game may be still unknown (and so in certain embodiments, the selected game may not be ready for play). In order to entertain the user until the results are known (e.g., when a wagered-on race result is declared), the system may, by way of example and not limitation, present the user with a racing game with an unknown finish line. The user may continue racing, without the wager results being revealed, as they are not yet known. Once the wager results become available, the finish line may be presented in the game as a metaphor indicating to the user that the token is ready to be played. When the user crosses the finish line, the game play for the selected game may begin or a payout may be revealed. A progress bar may also be displayed, reflecting the progress of token availability.

Optionally, the token, or a portion of the value of the token, is not wagered until a certain event occurs with respect to the game.

Non-limiting examples of an event that may be used to trigger a wager and/or an award (which may actually be a delayed reveal or partial reveal of winnings resulting from a bet on a known completed event, such as a horse race), include, but are not limited to:

- the user winning a game;
- the user solving at least a portion of a puzzle;
- the user striking one or more targets;
- the user achieving a certain number of points;
- the user achieving a certain performance level or title;
- the user accomplishing a task within a specified period of time;
- the user accessing a certain virtual area;
- the user collecting a certain virtual item;
- the user beating another user playing the interactive game;
- the user playing a certain period of time;
- a random event;
- completion of a game;
- etc.

Optionally, a user may be awarded bonus tokens based at least in part on the occurrence of one or more specified events, such as one or more of the above listed events, within an interactive game.

Optionally, the game may be ended when all the wager results are revealed to the user during the game. Optionally, when all the wager results are revealed to the user during the game, the user may be prompted and enabled to purchase additional tokens which may be wagered and which will enable the user to continue playing the game, without the user having to start the game over. Optionally, the system may enable the user to continue playing the game with no additional token(s)/wager(s) revealed to the user Optionally, the user may inspect the results of the underlying wager(s) (and/or risk reward event(s)) and view the corresponding payouts without having to play the interactive game (e.g., by accessing a user account interface). Optionally, the results of the bets and the winning amounts (if any) are automatically revealed to the user upon the user completing the corresponding game. Optionally, the user may be able to collect or withdraw winnings without having to play a game (e.g., via a user account information user interface).

Optionally, a user may be awarded tokens as a consolation prize for losing one or more bets, for playing a certain number of games, for purchasing a certain number of tokens, for being a registered user for a specified period of time, randomly, and/or otherwise.

Optionally, a token, or group of tokens may be shared by a group of users. For example, a group of users may pool funds together to purchase a group of one or more tokens. All of the users may have been contributed equally to the purchase, or different users may have contributed different amounts to the token purchase. The users may optionally play an interactive game together (e.g., a multi-player interactive game), wherein award reveals may occur upon certain events within the game, as similarly discussed above. Optionally, the award reveals may be provided to all the users (or a subset thereof), at substantially the same time. Optionally, the distribution of the payout to users may be proportionate to their share of the contribution in purchasing the token(s).

Optionally, two or more users may play against each other in an electronic game and place bets, using tokens, as to who will win, where the winner is awarded the tokens (and the associated race winnings) bet by the loser. Optionally, the system determines whether a given user has viewed the results of wagers associated with a token by examining the history of winning reveals for the respective token. For example, the winnings may have been revealed to the user during an interactive game or by the user examining the user's account information. If the user has viewed the results of wagers associated with a token, the system may prevent the user from betting that token against another user in a game, as the user may otherwise unfairly bet a token that the user knows has little or no winnings associated with it. Optionally, a process may be utilized to enable a wagering outcome to be transmitted and revealed later securely, so that it will be known whether the wagering outcome was viewed by the user and/or system.

For example, a process may be provided enabling a wagering outcome to be encrypted, transmitted and later revealed securely, where an indication is provided if the outcome had been earlier revealed or inspected. For example, this process enables the system to place wagers, and without knowing the wager results, assign the wager results (e.g., in the form of tokens) to users. This prevents the system operator from favoring certain users with tokens that are known to be good tokens, because the system will not know which tokens are "good" tokens, associated with significant winnings. Further, this process enables a user to initiate a game using a token, and if the user quits the game without the system revealing the token results, lets the user re-use the token in another game or in a bet with another user. Thus, certain embodiments enable the system to determine if a reveal occurred or not, and to transfer and manipulate tokens, without knowing a wager outcome associated with a token prior to the outcome being revealed to the user.

By way of illustration, online wagering would benefit from such a mechanism to exchange secret information (e.g., wager results associated with a token) so that the results cannot be revealed by the system or a user without evidence of their having done so. Further, the mechanism provides a reveal timestamp, indicating when the results was revealed, and record a tamper proof journal entry of the exchange of information.

In an example embodiment, the system may place wagers (e.g., random wagers). The wager results, when received, are cryptographically sealed. The results may be viewed, but the process of viewing creates a permanent record that the viewing has occurred so that the viewer (whether the system or a user) cannot hide the fact that the wager results were viewed or otherwise revealed.

By way of further example, the system may request a number of previously settled and securely sealed wagers (tokens) to reveal to a user. Some of the tokens, during game play, are revealed to the user, while others are not. The tokens that are not revealed are "returned" to the dispensing system. Because there is no indication that the seal was "broken" and the wagers revealed, the dispensing system has confidence that the "returned" tokens have not been revealed and can dispense them again later to the user (or optionally another user).

In particular, with reference to a series of tokens in the foregoing examples, the series of tokens may be the same as an associated series of facts (wager outcomes). When a fact is encrypted with an asymmetric or symmetric key it becomes a secret. When it can be established that an entity (e.g., the system, a viewer, a recipient) has access to both the secret and the key then it can be presumed that the secret has been revealed to the entity.

By way of example, and not limitation, an illustrative process will now be described.

Party A (e.g., a wager placing system) places the wagers and knows the outcomes. A batch of outcomes are selected and shuffled using commutative encryption with Party B. The batches may optionally be formed so that each batch is associated with a similar total value of the wagers, so that each batch has the same or approximately the same value. Neither Party A nor B knows the order of the shuffled, encrypted wager outcomes secrets. Party B (or Party C) (assigner of tokens to wagers) additionally applies one or more keys based on one or more salted hash sequences to further encrypt the secrets in the shuffled order. Keys may be stored with the encrypted sequences so that secrets need to be decrypted in shuffled order. At this point, Party A had knowledge of the outcomes, but cannot decrypt the items in the shuffled order. Party B or Party C knows the sequence but still does not know the original outcomes.

Individual secrets in the shuffled order can be dispensed to third parties which request the keys for secrets they reveal. Once the keys are distributed, the system may assume the secrets have been revealed (whether or not the keys have been actually used to reveal the secrets.

If Party B or Party C wants to associate tokens with secrets, the tokens can be stored in a known sequence (with an incrementing identifier, by way of example). The tokens are then defined to be assigned in the shuffled secret order.

Keys may be exchanged and/or recorded using public proof of work networks (such as the Bitcoin network, which verifies transactions using encryption) and linked time stamping, or otherwise.

Optionally, a token may be configured to place wagers in different time frames and/or in different currencies. For example, for a given token or set of tokens to be used to access an interactive game, the system may place some or all of the bets in different countries, with respectively different currencies. Because a given token or set of tokens may be associated with wagers placed on a plurality of events (e.g., races), a given wager may be placed on an event (e.g., a race) occurring at a different time than another event corresponding to another of the wagers.

Optionally, tokens may be used to purchase virtual items in a game, such as more plays of the game, additional lives, bonus points, land, weapons, powers, etc. Optionally, virtual currency is provided to the user to make such purchases as a benefit of purchasing a token to be wagered. As noted elsewhere herein, promotional tokens may be provided to the user as a rebate and/or utilizing a portion of the profits received by the system operator. Thus, the promotion tokens may be used as a marketing tool enabling the user to make additional wagers.

Optionally, the system may include an API (application programming interface), that enables third party game developers to interface their games to the system, so that the third party games may be used similarly described above to provide delayed reveals of the results of wagers on sporting or other events. Optionally, the third party developers may embed their games on a site hosted by the system or elsewhere, such as on a social networking site, a racetrack site, or otherwise. For example, the API may be utilized as a conduit by the third party game to provide indications of user interactions with the third party game to the system, wherein the system is configured to provide a delayed reveal of at least one wager based at least in part on the indications of user interactions with the third party game. The API may also be used by the system to transmit award reveals to the third party game to be displayed to the user via the third party game.

Certain embodiments may utilize Geographic Positioning Systems (GPS) and/or other location identification systems (e.g., cell tower or Wi-Fi triangulation) to determine if a user is within a legal or authorized geographical area with respect to the types of wagers being placed by the system, and if not, the user may be so notified and/or the wagering may be inhibited and/or the purchase of tokens may be inhibited.

Certain example embodiments will now be described with respect the figures. FIG. 1 illustrates an example architecture.

A gaming system 104 is configured to provide some or all of the functionality discussed above. For example, the gaming system 104 may store user accounts, including ADW information, token inventory, and winnings stored in a player account, history of winnings and withdrawals, history of winning reveals for respective tokens, identification verification information, and so on. The system may provide some or all of the user interfaces discussed herein for display on user terminals. A user terminal may be, by way of example and not limitation, a phone, tablet computer, laptop computer, desktop computer, smart watch, interactive television, game console, entertainment device, etc. The system 104 may also provide the functionality to sell tokens to users, host or provide access to interactive games integrated into a wagering system, enable a user to select interactive games to play, place wagers corresponding to token amounts, determine wager results, detect user interactions with the user selected interactive game, reveal winnings to user during the interactive games based at least in part on interactive game events and wager results, determine if the user is attempting to wager with a token which wager results have already been revealed to the user, and so on.

The gaming system 104 may communicate over a network 102 (e.g., the Internet, wide area network, local area network, etc.) or other public or private communication medium to a plurality of wagering systems 106, 108 via which the gaming system 104 may place wagers. For example, the wagering systems 106, 108 may be associated with horse racing (e.g., a pari-mutuel betting system), dog racing, and/or other type of activity for which wagers may be accepted. The wagering systems 106, 108 may include displays, keyboards, network interfaces, and the like. One or more user terminals 110, 112 (which may be a desktop computer, a laptop computer, a tablet computer, an interactive television, smart phone, or other networked system including a processing device) are coupled over the network 102 to the gaming system 104. As similarly discussed above, a user via a user terminal may access the functionality provided by the gaming system 104.

Figure 2:
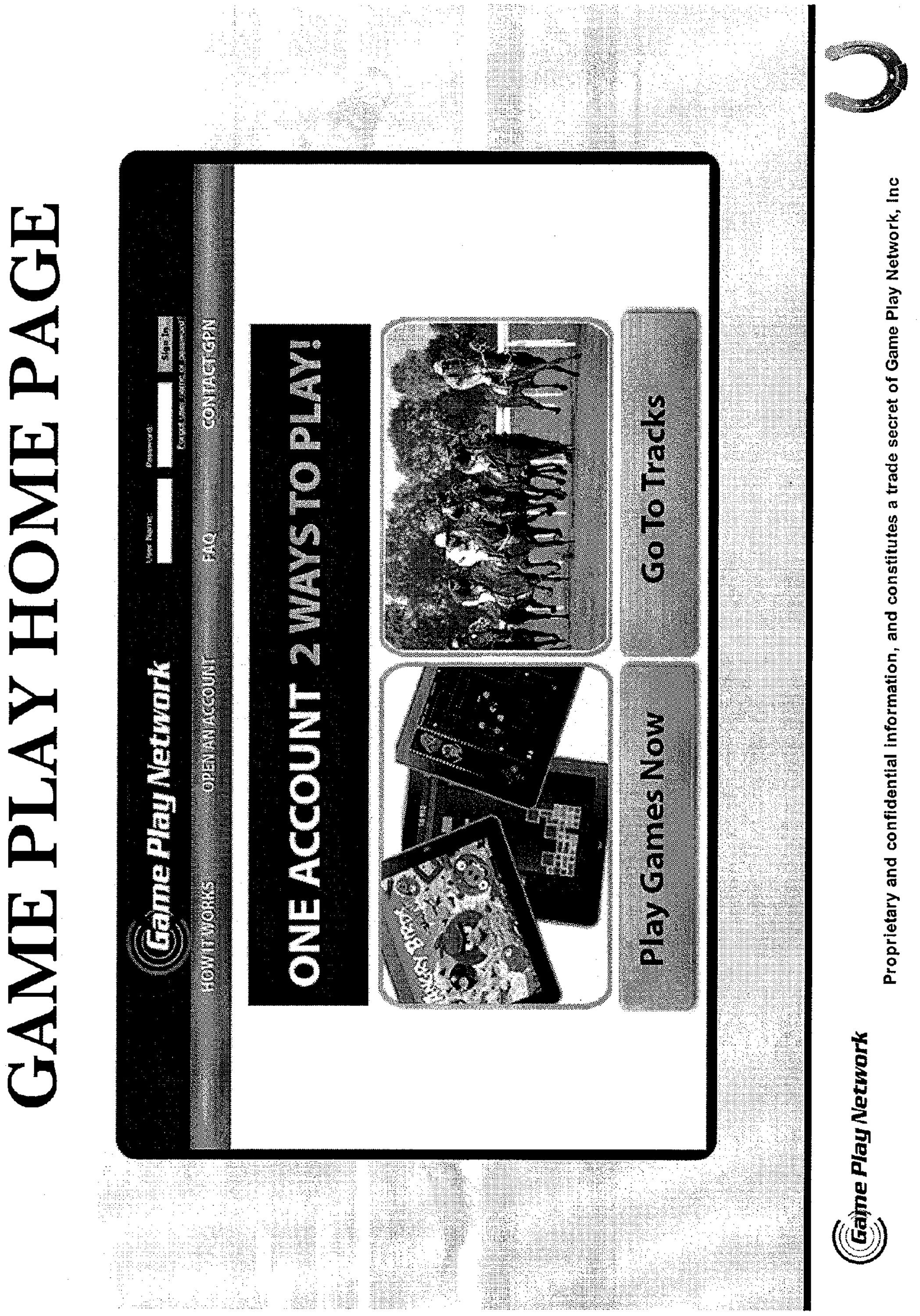
FIGS. 2-9 illustrate example user interfaces.

FIG. 2 illustrates an example user interface, enabling a user to select an interactive game mode ("play games now") or a user wagering mode ("go to tracks"). The user may utilize either mode with the same user account and ADW account, or with different user accounts and ADW accounts.

Figure 3:
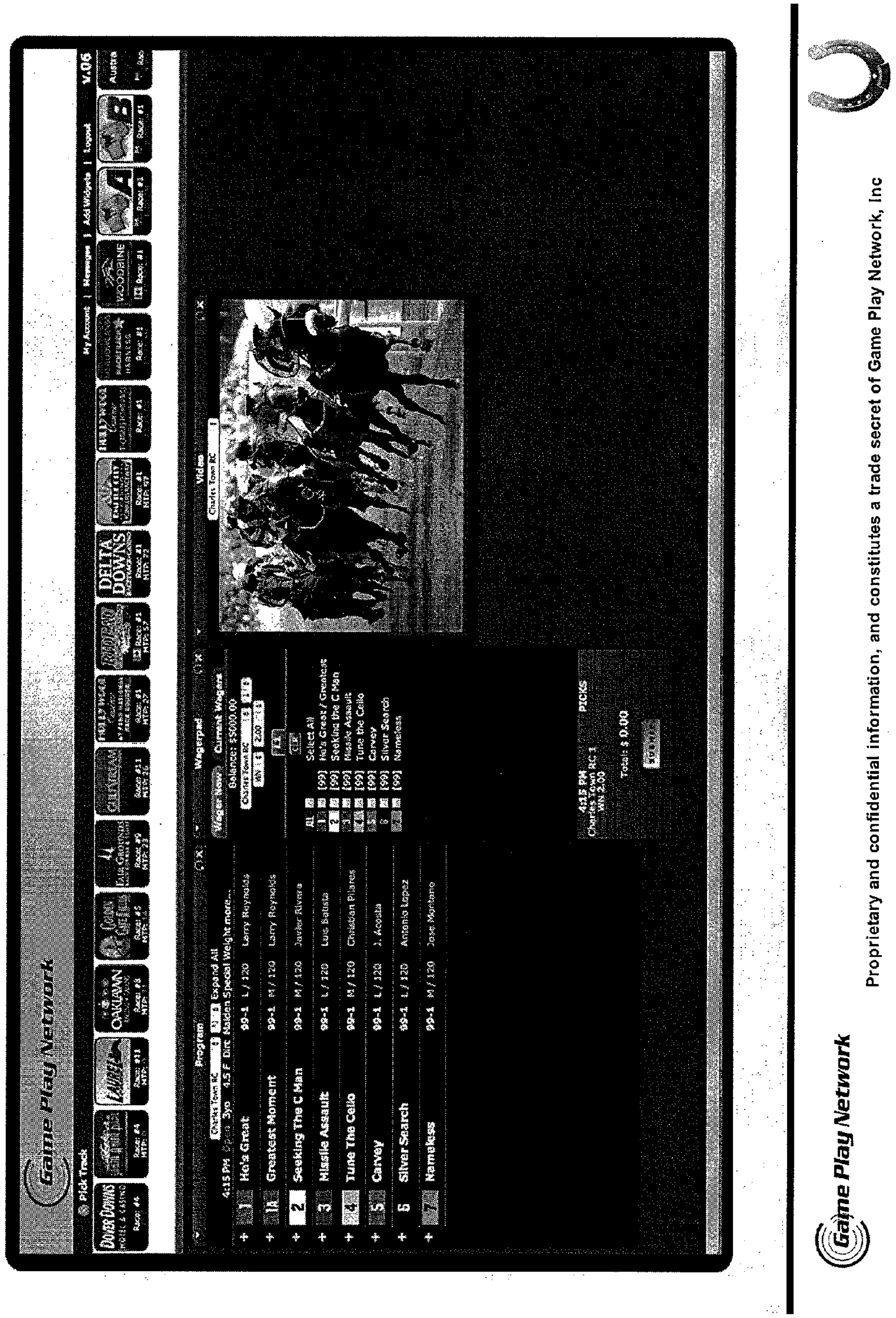
Figure 4:
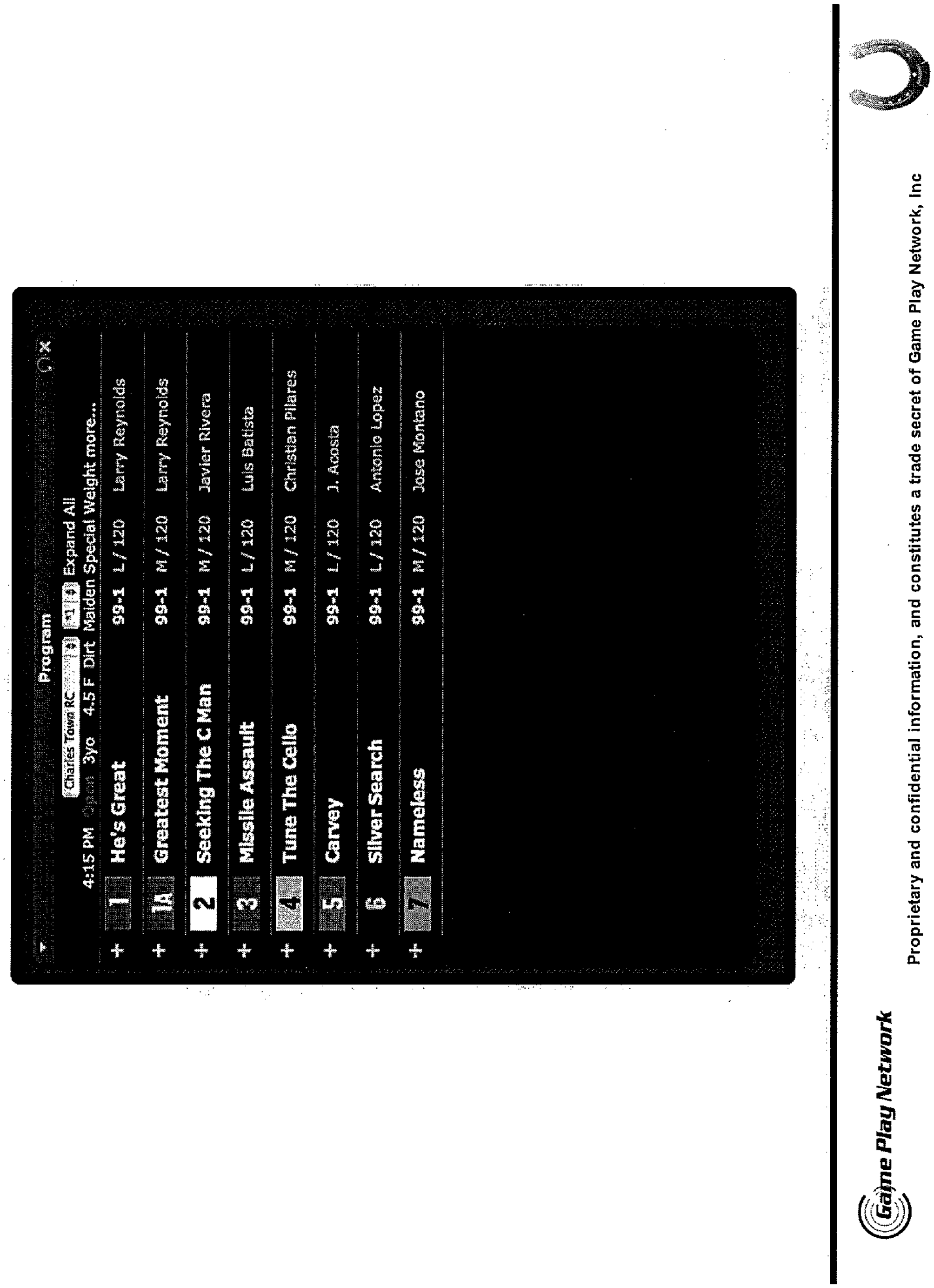

FIG. 3 illustrates an example user interface accessible in the user wagering mode. The user may be able to select a race track, view the horses and respective jockeys in a given race, view the current odds, view weight penalties, view a live video of a corresponding race, etc. FIG. 4 illustrates an example user interface enabling a user to view their current balance and current wagers, and place one or more new wagers by selecting one or more horses in a given race.

Figure 5:
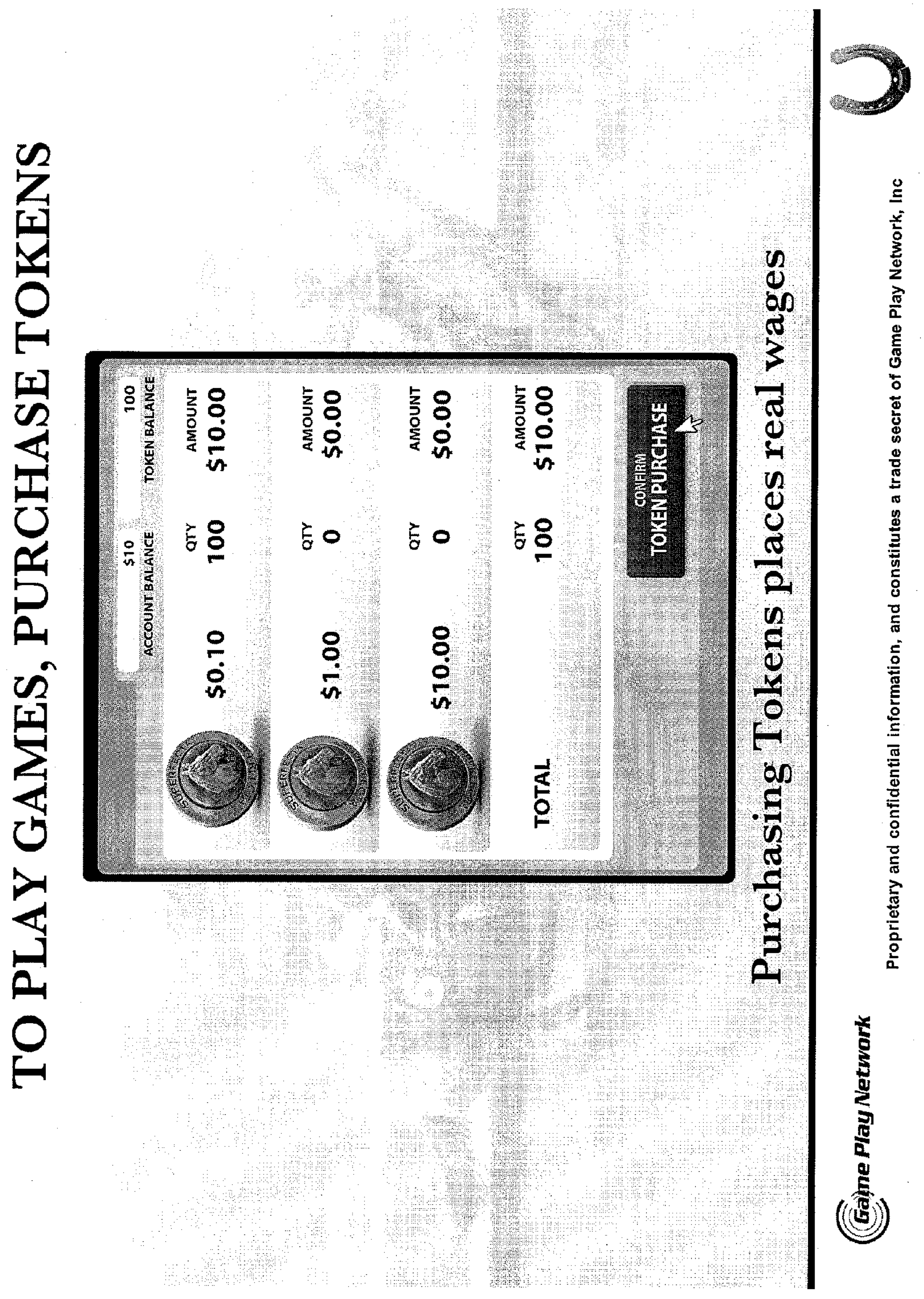

FIG. 5 illustrates a user interface from the interactive game mode. The user interface displays user account information accessed from memory, including the user's current account balance (e.g., ADW balance information) and the user's current token balance. In addition, the user interface offers a catalog of tokens which the user may purchase. The tokens may be available in different values. The user may be able to specify the quantity of each token type the user wants to purchase. A system may calculate the total value of the quantity of tokens for each token type, and the overall total. Once the user is satisfied with the selection, the user can confirm the token purchase by activating a token purchase confirmation control.

Figure 6:
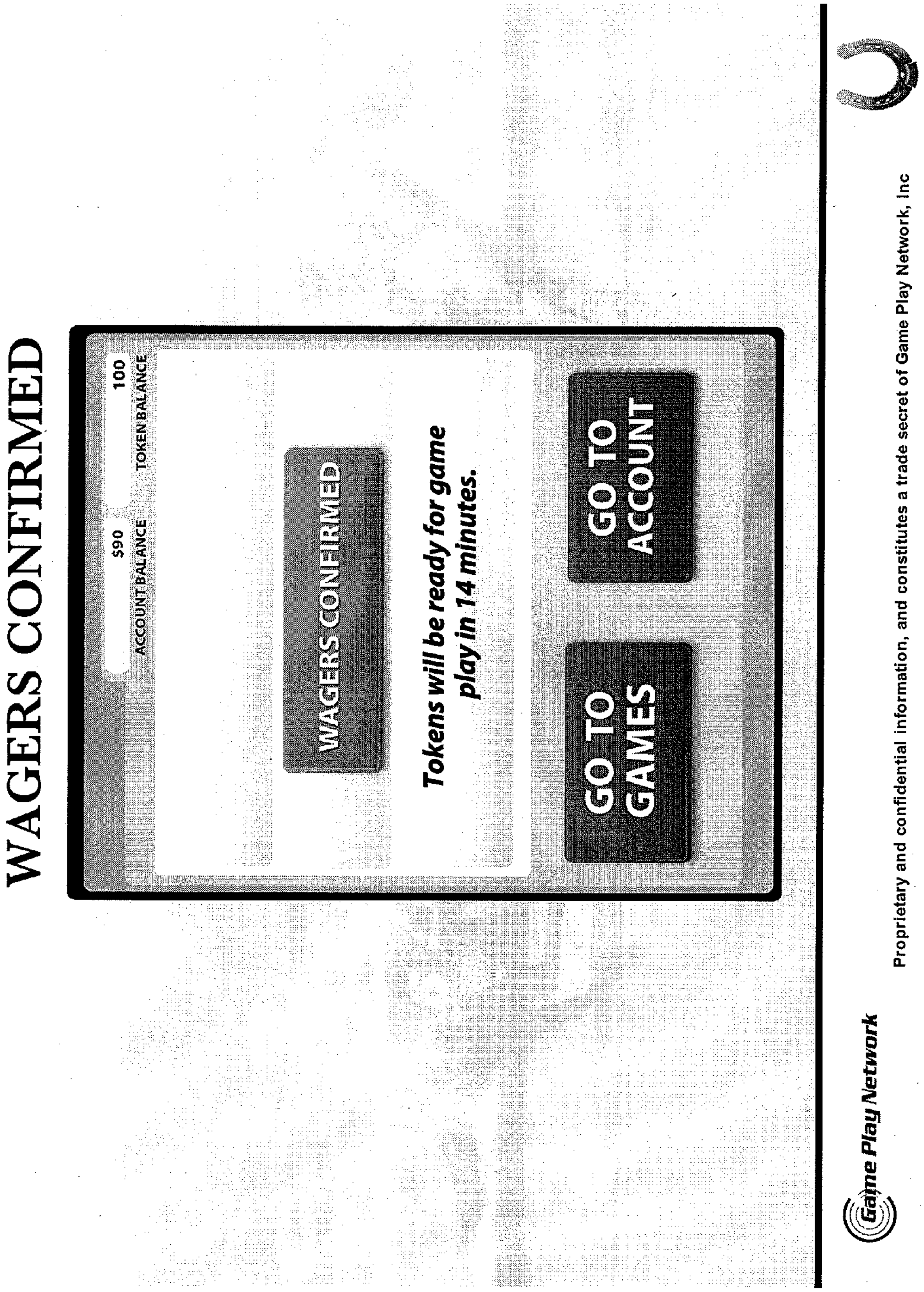

FIG. 6 illustrates an example user interface providing a wager confirmation notification, and indicating when the tokens will be ready for game play (wherein the time may be based at least in part on when the next race is scheduled to occur on which the bet may be placed). A "go to games" control is provided which when activated causes a game interface to be presented. A "go to account" control is provided which when activated causes the users account information to be presented.

Figure 7:
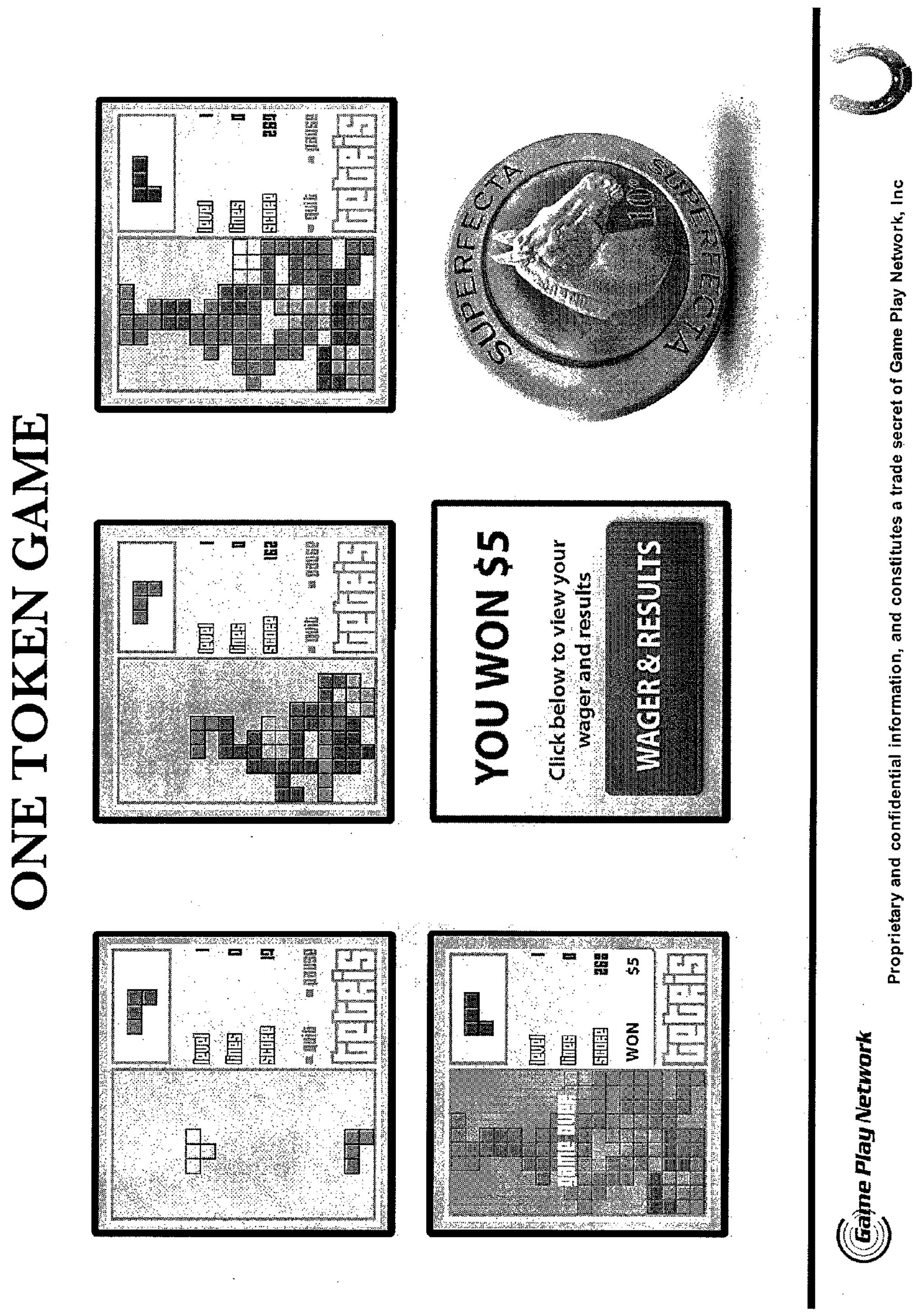
Figure 8:
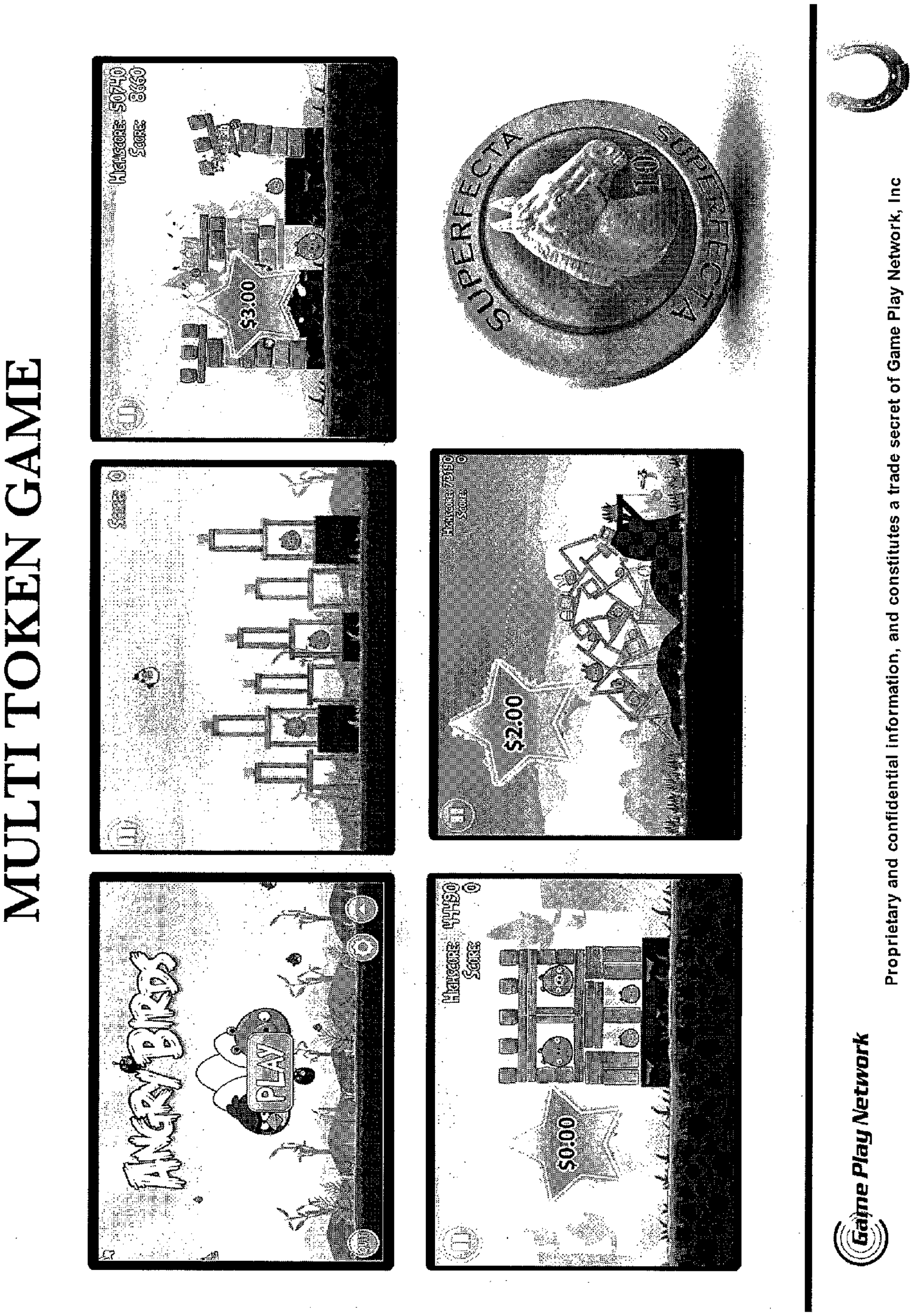

FIG. 7 illustrates an example game user interface displaying a one token interactive game and an award amount. FIG. 8 illustrates an example game user interface displaying a multi token interactive game and award amounts for different game events.

Figure 9:
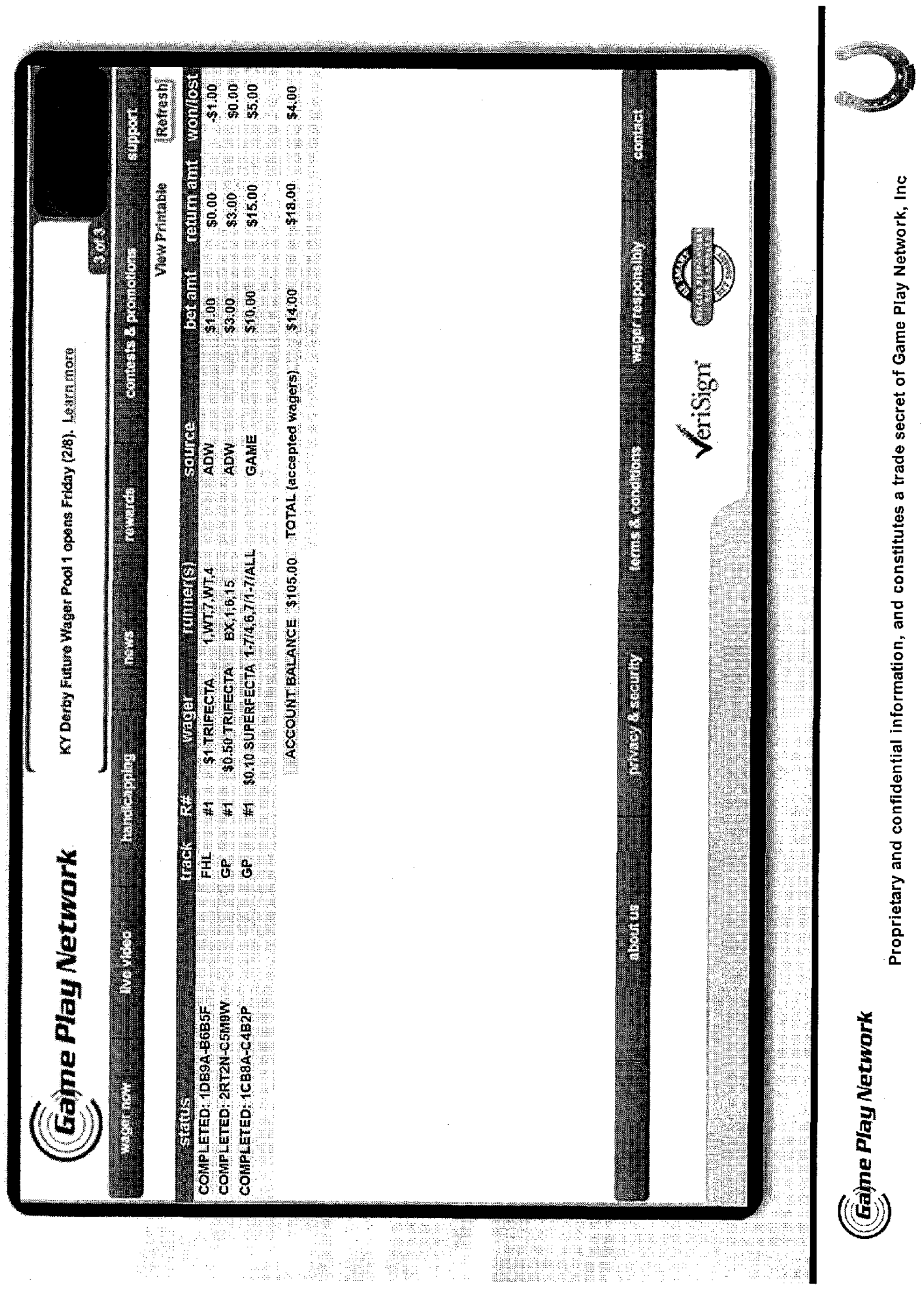

FIG. 9 illustrates an example user account interface reporting the status of races wagered on, the race track, the wager type, the runners, the source, the bet amount, the return amount, and the amount won or lost.

It is understood that while certain examples are discussed herein with respect to applicability to sporting events, such as horse racing, the systems and processes disclosed herein may be applied to other events, such as to other events on which wagers may be placed, including by way of example, a lottery, stock market activity, a political race, etc.

Certain embodiments may be implemented via hardware, software stored on media, or a combination of hardware and software. For example, certain embodiments may include software/program instructions/modules stored on tangible, non-transitory computer-readable medium (e.g., magnetic memory/discs, optical memory/discs, RAM, ROM, FLASH memory, other semiconductor memory, etc.), accessible by one or more computing devices configured to execute the software (e.g., servers or other computing device including one or more processors, wired and/or wireless network interfaces (e.g., cellular, Wi-Fi, Bluetooth, T1, DSL, cable, optical, or other interface(s) which may be coupled to the Internet), content databases, customer account databases, etc.). Data stores (e.g., databases) may be used to store some or all of the information discussed herein in memory.

By way of example, a given computing device may optionally include user interface devices, such as some or all of the following: one or more displays, keyboards, touch screens, speakers, microphones, cameras and video capture devices, infrared and/or other wavelength detection devices, mice, track balls, touch pads, tilt sensors, accelerometers, biometric sensors (e.g., fingerprint or face recognition sensors for authenticating a user) printers, etc. The computing device may optionally include a media read/write device, such as a CD, DVD, Blu-ray, tape, magnetic disc, semiconductor memory, or other optical, magnetic, and/or solid state media device. A computing device, such as a user terminal, may be in the form of a general purpose computer, a personal computer, a laptop, a tablet computer, a mobile or stationary telephone, an interactive television, a set top box coupled to a display, etc. Certain embodiments may be able to conduct hundreds (or more) of transactions and processes described herein within a second.

While certain embodiments may be illustrated or discussed as having certain example components, additional, fewer, or different components may be used. Process described as being performed by a given system may be performed by a user terminal or other system or systems. Processes described as being performed by a user terminal may be performed by another system. Data described as being accessed from a given source may be stored by and accessed from other sources. Transmissions described herein may be via a wired and/or wireless network or other communications link. Further, with respect to the processes discussed herein, various states may be performed in a different order, not all states are required to be reached, and fewer, additional, or different states may be utilized.

User interfaces described herein are optionally presented (and user instructions may be received) via a user computing device using a browser, other network resource viewer, or otherwise. For example, the user interfaces may be presented (and user optionally instructions received) via an application (sometimes referred to as an "app"), such as a dedicated app configured specifically for gaming or betting activities, installed on the user's mobile phone, laptop, pad, desktop, television, set top box, phone, or other terminal. Various features described or illustrated as being present in different embodiments or user interfaces may be combined into the same embodiment or user interface.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. Further, embodiments may include several novel features, no single one of which is solely responsible for the embodiment's desirable attributes or which is essential to practicing the systems, devices, methods, and techniques described herein. In addition, various features of different embodiments may be combined to form still further embodiments. For example, aspects found in different user interfaces may be combined to form still further user interface.

What is claimed is:

1. A method of placing wagers, the method being implemented by a computer system having one or more processors programmed with computer instructions that, when executed by the one or more processors, program the computer system to perform the method, the method comprising:

enabling the user to utilize a single advanced deposit wager account to: purchase a first token, and place wagers directly on sporting events, wherein wager results from the directly placed wagers are reported outside of the electronic game;

obtaining, by the computer system, a first indication that a user acquired the first token;

obtaining, by the computer system, a second indication that the user acquired a second token;

identifying, by the computer system, a first value of the first token;

identifying, by the computer system, a second value of the second token;

at least partly in response to the first indication, placing, by the system, a first wager on at least one first sporting event, wherein a first wager amount of the first wager is based on the first value;

at least partly in response to the second indication, placing, by the computer system, a second wager on at least one second sporting event, wherein a second wager amount of the second wager is based on the second value;

obtaining, by the computer system, results of the first wager on the at least one first sporting event;

obtaining, by the computer system, results of the second wager on the at least one second sporting event;

identifying, by the computer system, either the results of the first wager or the results of the second wager to be revealed to the user through an electronic game;

detecting, by the computer system, a first interaction event with respect to the user and the electronic game; and at least partly in response to detecting the first interaction event with respect to the user and the electronic game, revealing the identified results of the first wager or the second wager to the user wherein the results of the first wager or the second wager are revealed in a delayed manner in the electronic game.

2. The method as defined in claim 1, wherein revealing the identified results of the first wager or the second wager is performed while the electronic game is in progress.

3. The method as defined in claim 1, wherein revealing the identified results of the first wager or the second wager is performed at completion of a game level or at completion of the electronic game.

4. The method as defined in claim 1, wherein the first token corresponds to the first wager, and wherein the second token corresponds to the second wager, for which the identified results are revealed in a delayed manner.

5. The method as defined in claim 1, wherein the first token corresponds to a portion of the first wager or a plurality of wagers, and wherein the second token corresponds to a portion of the second wager, for one or more user accounts for which the identified results are revealed in a delayed manner.

6. The method as defined in claim 1, the method further comprising allocating at least one of the first or second wager in a pari-mutuel system.

7. The method as defined in claim 1, the method further comprising:

allocating at least one of the first or second wager in a pari-mutuel system, wherein at least one portion of the first or second wager is placed on a straight bet and at least one portion of the first or second wager is placed on an exotic bet.

8. The method as defined in claim 1, wherein revealing the identified results of the first or second wager result further comprises revealing an award expressed in the form of a currency value.

9. The method as defined in claim 1, the method further comprising enabling the user to access the first or second wager result via a user account user interface.

10. The method as defined in claim 1, wherein the first interaction event comprises:

the user solving at least a portion of a puzzle;

user achieving a game objective;

the user striking one or more targets;

the user achieving a first number of points;

the user achieving a first performance level;

the user accessing a first virtual area;

the user collecting a first virtual item;

and/or the user playing a first period of time.

11. The method as defined in claim 1, wherein:

placing a first wager on at least one first sporting event and/or placing a second wager on at least one second sporting event further comprises placing bets on a plurality of races, and determining the results of the first wager on the at least one first sporting event and determining the results of the second wager on the at least one second sporting event further comprises determining the results of the bets on the plurality of races.

12. The method as defined in claim 1, wherein the electronic game comprises an electronic: action game, puzzle game, shooting game, pinball game, card game, and/or game of chance strategy game, simulation game.

13. The method as defined in claim 1, wherein the first and/or second token corresponds to a plurality of first and/or second wagers or a portion of the first and/or second wager.

14. The method as defined in claim 1, wherein processing a user acquisition of a first and/or second token further comprises withdrawing funds from an advanced deposit wagering account associated with the user.

15. The method as defined in claim 1, the method further comprising providing an application programming interface enabling a third party game to interface with a betting system and to provide indications of user interactions with the third party game to the system, wherein the betting system is configured to provide a delayed reveal of the at least one identified wager based at least in part on the indications of user interactions with the third party game.

16. The method as defined in claim 1, the method further comprising:

determining or estimating when the identified results will be received at the system; and inhibiting the user from playing the electronic game for a period of time, the period of time based at least in part on the determination or estimation as to when the identified results will be received at the system.

17. The method as defined in claim 1, wherein the first and/or second token comprises a plurality of tokens.

18. The method as defined in claim 1, the method further comprising modifying a gameplay based at least in part on the identified results.

19. The method as defined in claim 1, the method further comprising modifying a game play based at least in part on a quantity, value and and/or type of tokens played by the user.

20. The method as defined in claim 19, wherein modifying the game play further comprises modifying:

game decision points, reordering game events, provisioning bonuses having a redemption value for physical goods, services, monetary exchange, modifying a form of an object within the game, modifying a path of a moving object within the game, ending a game round or period of play relatively earlier, extending a game round or period of play, and/or enabling the user to continue playing at a next game level without having to restart at the beginning of the game.

21. The method as defined in claim 1, the method further comprising applying at least a portion of winnings associated with the first token, to one or more other tokens, wherein the applied winnings are revealed with respect to electronic games to which the one or more other tokens are applied.

22. The method as defined in claim 1, the method further comprising:

detecting a second interaction event with respect to the user and the electronic game; and at least partly in response to detecting the second interaction event with respect to the user and the electronic game revealing a portion of the remaining wager results.

23. The method as defined in claim 18, wherein modifying the game play further comprises modifying:

game decision points, reordering game events, provisioning bonuses having a redemption value for physical goods, services, monetary exchange, modifying a form of an object within the game, modifying a path of a moving object within the game, ending a game round or period of play relatively earlier, extending a game round or period of play, and/or enabling the user to continue playing at a next game level without having to restart at the beginning of the game.

24. A method of placing wagers, the method being implemented by a computer system having one or more processors programmed with computer instructions that, when executed by the one or more processors, program the computer system to perform the method, the method comprising:

processing, by the computer system, a user acquisition of a first token;

processing, by the computer system, a user acquisition of a second token;

identifying, by the computer system, a first value of the first token;

identifying, by the computer system, a second value of the second token;

at least partly in response to the user acquisition of the first token, placing, by the system, a first wager on at least one first sporting event, wherein a first wager amount of the first wager is based on the first value;

at least partly in response to the user acquisition of the second token, placing, by the system, a second wager on at least one second sporting event, wherein a second wager amount of the second wager is based on the second value;

obtaining, by the computer system, results of the first wager on the at least one first sporting event;

obtaining, by the computer system, results of the second wager on the at least one second sporting event;

identifying, by the computer system, either the results of the first wager or the results of the second wager to be revealed to the user through an electronic game;

detecting, by the system, a first interaction event with respect to the user and the electronic game;

at least partly in response to detecting the first interaction event with respect to the user and the electronic game, revealing the identified results of the first wager or the second wager to the user; and enabling, by the computer system, the user to utilize a single advanced deposit wager account to purchase tokens and to place wagers directly on sporting events, wherein wager results corresponding to the purchased tokens are revealed in a delayed manner in an electronic game environment, and wherein wager results from the directly placed wagers are reported outside of the electronic game environment.

* * * * *